March 4, 1958     P. M. SHEY     2,825,079
WASHING ATTACHMENT FOR HOSE
Filed March 19, 1956     2 Sheets-Sheet 1
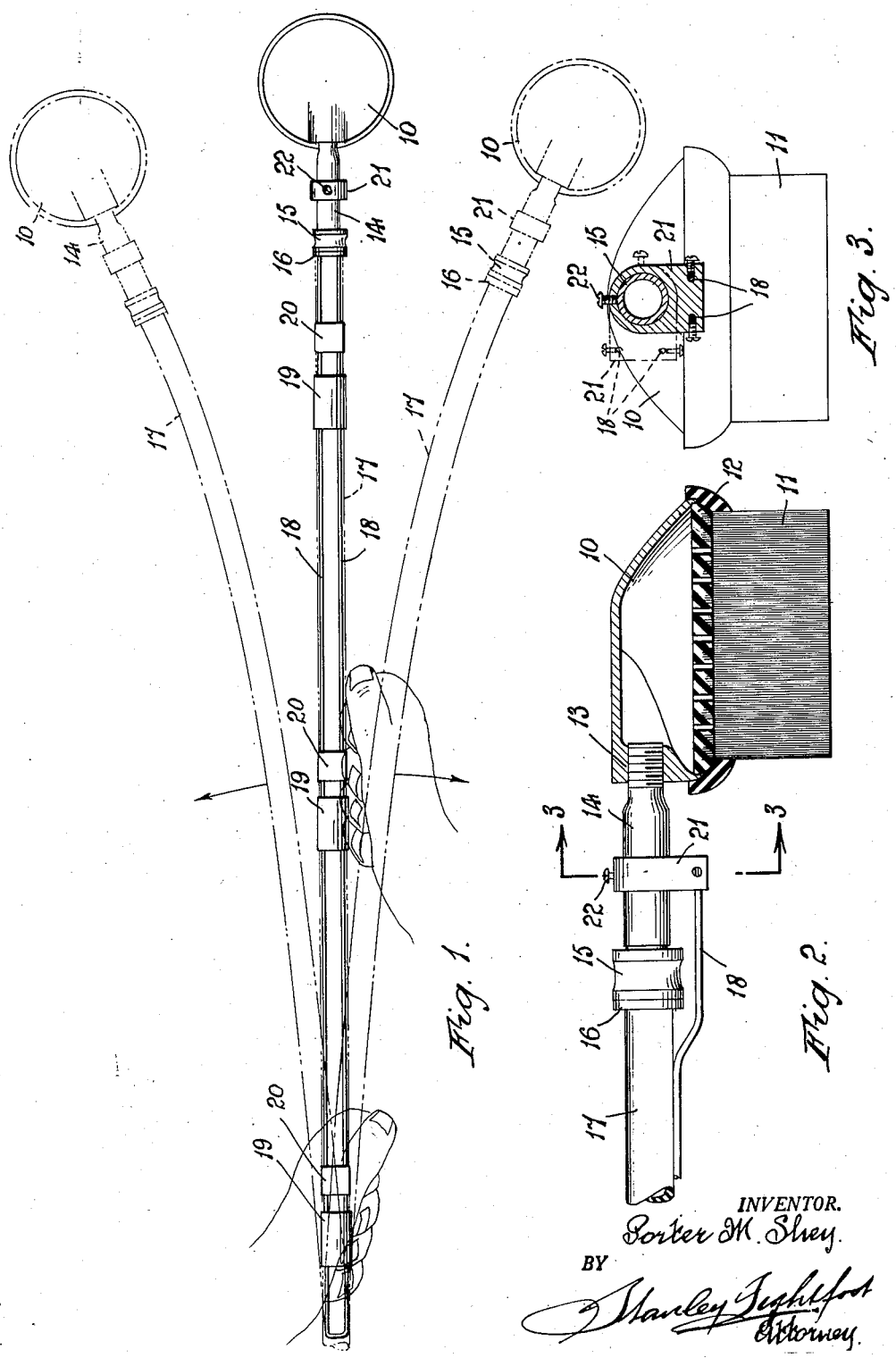
INVENTOR.
Porter M. Shey.
BY
Stanley Lightfoot
Attorney.

March 4, 1958 P. M. SHEY 2,825,079
WASHING ATTACHMENT FOR HOSE
Filed March 19, 1956 2 Sheets-Sheet 2
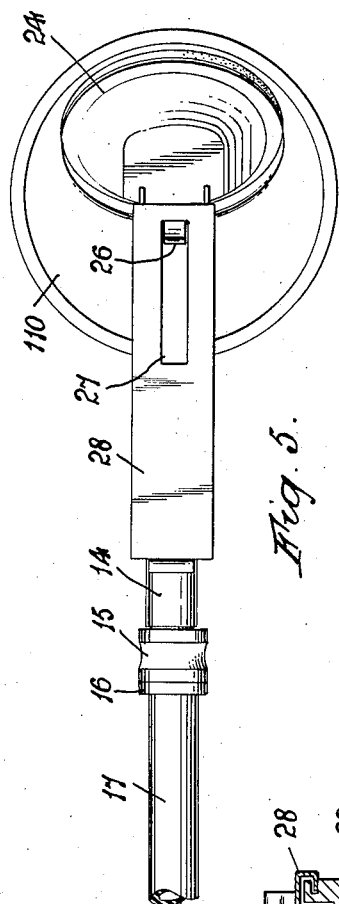
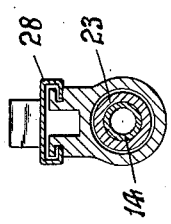
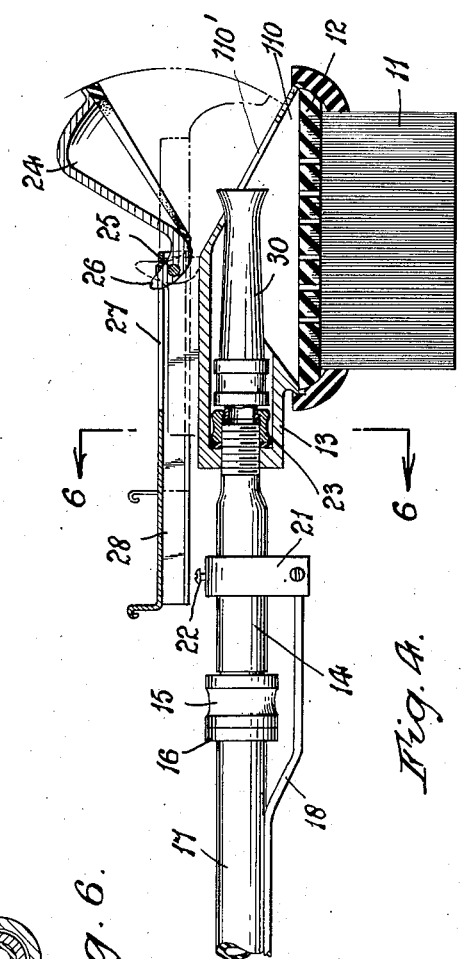
INVENTOR.
Porter M. Shey.
BY
Stanley Lightfoot
Attorney.

United States Patent Office 2,825,079
Patented Mar. 4, 1958

2,825,079
WASHING ATTACHMENT FOR HOSE

Porter M. Shey, Detroit, Mich.

Application March 19, 1956, Serial No. 572,336

2 Claims. (Cl. 15—128)

This invention relates to a washer head or an attachment therefor, whereby a water hose may be connected to said head and resiliently supported throughout a considerable length of said hose in a manner whereby such portions of said hose and its resilient support may operate, in combination, as the handle element of said head in such manner that the controlled swinging of said washer head may be effected in a pendulum-like manner, utilizing one of the hands of the operator as a pivot. Thus, a very effective scrubbing action may be secured with a minimum of effort on the part of the operator and in a manner facilitating the carrying out of the scrubbing operation with comparative ease, even in positions and under circumstances where such an operation would ordinarily prevent difficulties.

More particularly, the invention contemplates the provision, with a washer head of the type referred to, of a flexible elongated rod or rods acting both as a support or reinforcement for a length of hose extending from the head and as a resilient willow-like control of the flexing of the hose, whereby it may be swung as a pendulum in a rhythmic manner, accompanied by a gradual arcuate bowing of the hose, to accomplish the purposes desired.

A still further object of this invention is to provide for directional control of the resiliency of the handle, formed by the combination of the hose and its elongated support, in a manner whereby the horizontal resiliency may be greater than the vertical resiliency, or vice versa, according to the wishes of the operator.

A further object is to provide means whereby the end of the hose may be connected with the washer head merely for the direct feeding of the water into washer head; or whereby a readily accessible nozzle may be mounted within the washer head for the control of the flow of water and thereinto.

Still further where such a nozzle is utilized within the head, it is proposed to provide a simply operable closure, which may be opened to afford access to the said nozzle for its adjustment or for the charging of the washer head with the soap chips, detergent or the like; and means for clamping such closure in a firmly sealed manner against leakage during washing or scrubbing operations.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawings, wherein:

Figure 1 is a plan view of my improved washing attachment shown in its association with a water hose;

Figure 2 is a detail longitudinal sectional view, on a larger scale, of the head portion of the device as attached to a conventional hose fitting;

Figure 3 is a detail cross section of the same taken on a plane indicated by the line 3—3 in Figure 2;

Figure 4 is a similar view to Figure 2 showing a modified form of washer head;

Figure 5 is a plan view of the said head; and

Figure 6 is a detail transverse section taken on a plane indicated by the line 6—6 in Figure 4.

Similar characters of reference indicate similar parts in the several figures of the drawing.

Referring first to Figures 1, 2 and 3, 10 indicates a hollow washer head having secured to the open face thereof a brush, mop or other cleaning implement 11 which has a perforated base 12 secured to said head for the passage of water or suds therethrough in the well-known manner, said head having a threaded boss at 13 to which the end of a water hose may be connected in any suitable manner.

I prefer to provide for this purpose a tubular adaptor or boss extension 14 provided at its outer end with a coupling member 15 adapted to engage a corresponding coupling member 16 carried by the end of the hose 17.

An important feature of the present invention is to be found in the manner in which the washer head is associated with an extended length of the hose attached thereto, in order to provide a characteristically flexible or willowy elongated handle through the medium of which a very effective scrubbing or mopping motion may be imparted to the said head. Thus the device may be operated in situations which ordinarily would render such movement of the head difficult or awkward; and this I accomplished by providing one or more springy rods 18 arranged to extend from the vicinity of the head proper 10 along the hose to an extent of preferably several feet whereby the natural flexibility of the hose may be partially restrained throughout that length.

By this means, the manual swinging of the hose from side to side, will result in that portion of the said hose extending rearwardly from the washer head being resiliently bowed, in the plane of its swinging, in a smoothly arcuate manner as clearly indicated in broken lines in Figure 1 of the drawing.

It is contemplated that an operator might quite conveniently grasp the hose, say with his left hand, at a point as represented at the extreme left of Figure 1 to act as a pivotal point, and, with the right hand grasping the hose at a point closer to the washer head (say, at about one-third of the distance towards said head as shown), swing the hose in a rhythmic pendulum motion throughout a relatively short angle to obtain the still greater angularity of motion of the head which would result by reason of the whipping action of the flexible handle.

It is desirable that the rod (or rods) 18 be held reasonably close to and in parallelism with the hose throughout the operation, and, for this purpose, I have indicated clamps 19 of any suitable form, and through which the hose may preferably be free to slip lengthwise so as not to tend to unduly brace the rods against performing their flexing; and I also show spacers 20 (where more than one rod is used) connecting the rods at suitable intervals, to prevent their becoming unduly separated and thus permitting the hose to slip therebetween to an undesirable extent.

While, when more than one rod is used, I prefer that they lie in a common plane which is perpendicular to the horizontal face of the washer head, thereby providing for greater flexibility horizontally than vertically (as viewed in the drawing), I have provided means whereby this position of the rods, relative to the head, may be varied so that the rods may be arranged in a horizontal plane common with that of the head, thus reducing the horizontal flexibility while increasing the vertical flexibility of the handle.

This adjustment I may provide for very simply by merely securing the forward ends of the rods 18 in a collar 21, which collar may be rotated, as on the adaptor, or extension 14 of the head, to bring the said rods into the relative position desired, when the said collar may then be secured in position of adjustment by means of the setscrew 22.

Referring, further, to Figures 4, 5 and 6; it will be seen that I have shown the adaptor or boss extension 14 as extending materially into the boss 13 of the washer head 110 to receive the coupling member 23 of a conventional hose nozzle 30. The nozzle in this case is accessible through an opening 110' in the head whereby it may be rotated in the manner well-known with hose nozzles to adjust the passage of water therethrough.

24 is a lid or closure, for the purpose of sealing the opening 110' during washing operations, and this closure is pivoted at 25 and provided with an operating finger 26 which extends into the slot 27 of a slide 28 in such manner that the rearward movement of the said slide, to the position shown in full lines in Figure 4 of the drawing, will cause said closure to be raised in the manner clearly indicated.

When the said slide is pushed forwardly, it not only permits the closure 24 to descend into closing position, but is projected over the said closure to bear thereon and to clamp it in such closed position, as clearly indicated in broken lines in the said Figure 4.

It will be seen that, by the improved combination of washer head and hose, I have utilized the flexibility of the hose (modified by the flexibility of the rod or rods or supporting structure) in such a manner that a unique mechanical action is obtained, which greatly facilitates the scrubbing and washing of the surfaces, such as the tops of cars or surfaces somewhat remote from the position of the operator. This flexibility thus may be utilized to provide for a desirably controlled pressure of the washing element on the work, in addition to a swinging movement of the head imparted thereto by one of the hands of the operator while the other hand acts as a pivot about which such swinging is effected.

It will be obvious that the extent of motion of the hand effecting the swinging is much less than that of the washer head, and that the said head swings through an angle greater than that of the angle of the manual motion with consequent increase in the efficiency of the scrubbing or cleaning operation.

It will also be noted that the rhythmic reflex action of the hose and its support assists in the cleaning action from one of its extremities to the other, thus reducing the effort required to perform the desired functions.

Where access to the interior of the washer head is desired (as where the nozzle 30 is housed therein), the arrangement described for the operation and clamping of a closure thereof is both simple and positive in operation, as will be readily observed.

This invention may be developed within the scope of the following claims without departing from the essential features of the said invention, and it is desired that the specification and drawing be read as being merely illustrative of a practical embodiment of the same and not in strictly limiting sense.

What I claim is:

1. In a device of the class described, in combination, a hollow perforated washer head, a water hose, means attaching said hose to said head whereby water may be admitted into said head, an elongated flexible member secured at one end to the region of the connection of said hose with said head, said member extending to such an extent along said hose as to afford a supporting reinforcement therefor, said member having greater flexibility in one transverse direction than in a direction at right angles thereto, means for adjusting the position of said member about the axis of said hose, and means attaching said member to said hose at intervals in its length.

2. In a device of the class described, in combination, a hollow perforated washer head, a tubular adaptor opening into said head, a water hose, means attaching said hose to said adaptor, an elongated flexible member secured at one end to the region of the connection of said hose with said head, said member extending to such an extent along said hose as to afford a supporting reinforcement therefor, said member having greater flexibility in one transverse direction than in a direction at right angles thereto, said member-attaching means being adjustable to rotated positions about said adaptor whereby to adjust the position of said member about the axis of said hose, and means attaching said member to said hose at intervals along its length.

References Cited in the file of this patent

UNITED STATES PATENTS

| | | |
|---|---|---|
| 805,579 | Patchen | Nov. 28, 1905 |
| 2,172,130 | Powell | Sept. 5, 1939 |
| 2,673,999 | Shey | Apr. 6, 1954 |
| 2,707,293 | Ferrer | May 3, 1955 |